United States Patent
Li

(10) Patent No.: US 8,388,161 B2
(45) Date of Patent: Mar. 5, 2013

(54) FIXING MECHANISM FOR BACKLIGHT MODULE AND BACKLIGHT MODULE

(75) Inventor: Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/143,113

(22) PCT Filed: Apr. 28, 2011

(86) PCT No.: PCT/CN2011/073457
§ 371 (c)(1),
(2), (4) Date: Jul. 1, 2011

(87) PCT Pub. No.: WO2012/142775
PCT Pub. Date: Oct. 26, 2012

(65) Prior Publication Data
US 2012/0268951 A1    Oct. 25, 2012

(30) Foreign Application Priority Data
Apr. 21, 2011 (CN) .......................... 2011 1 0101150

(51) Int. Cl.
*F21V 33/00* (2006.01)
(52) U.S. Cl. ........ 362/97.1; 362/632; 362/633; 362/634
(58) Field of Classification Search .............. 362/632, 362/633, 634, 97.1, 97.2, 97.3
See application file for complete search history.

(56) References Cited

U.S. PATENT DOCUMENTS

| | | | | |
|---|---|---|---|---|
| 2007/0127270 | A1* | 6/2007 | Chang | 362/633 |
| 2008/0170416 | A1* | 7/2008 | Yuan et al. | 362/633 |
| 2010/0296310 | A1* | 11/2010 | Jeong et al. | 362/606 |

FOREIGN PATENT DOCUMENTS

| | | |
|---|---|---|
| CN | 1361446 A | 7/2002 |
| CN | 101363597 A | 2/2009 |
| CN | 101464596 A | 6/2009 |
| CN | 101672991 A | 3/2010 |
| CN | 101769511 A | 7/2010 |
| CN | 101963309 A | 2/2011 |
| CN | 201853028 U | 6/2011 |
| JP | 2009-99340 A | 5/2009 |
| KR | 2004-0062285 A | 7/2004 |
| KR | 10-0661151 B1 | 12/2006 |

* cited by examiner

*Primary Examiner* — Laura Tso
(74) *Attorney, Agent, or Firm* — Sughrue Mion, PLLC

(57) ABSTRACT

A fixing mechanism for a backlight module and a backlight module are provided in the present invention. The fixing mechanism comprises a plurality of retaining posts and a plurality of retaining sheets. The retaining posts are protruded from a back plate. The retaining sheet is engaged with an upper end of the retaining post for fixing an optical assembly. Moreover, the part of the fixing structure is made of elastic materials, so that it besides can steadily fix the optical film and make no clearance to be created, and also can prevent the optical film from escaping from orientation under the effect of hot-expansion and cold-shrinkage.

13 Claims, 5 Drawing Sheets

FIXING MECHANISM FOR BACKLIGHT MODULE AND BACKLIGHT MODULE

BACKGROUND OF THE INVENTION

1. Field of the Invention

The present invention relates to a fixing mechanism for a backlight module, and more particularly to a fixing mechanism for fixing an optical assembly of a backlight module and to a backlight module.

2. Description of the Prior Art

A liquid crystal display (LCD) panel has been widely applied to electronic products with growth potential, such as a monitor, a notebook computer, a digital camera and so on. After an LCD panel manufacturer produces an LCD panel, it is needed to first combine the LCD panel with a color filter, then seal the both together to be filled with liquid crystal, and next assemble them with a backlight module, a driving IC, a control circuit and so on to form an LCD module for being sold to a downstream manufacturer.

The backlight module is one of important components of an LCD. Because the liquid crystal molecule can not emit light, the function of the backlight module is to provide enough brightness and uniform light so that the LCD can normally display an image. The backlight module mainly consists of a light source, a light cover, a reflector sheet, a light guide plate, a diffusion sheet, a brightness enhancement film and an outer frame.

Generally, the backlight module may be divided into two modes of a side-light type backlight module and a direct-light type backlight module according to the position of the light source. Please refer to FIG. 1, which discloses a partial sectional view of a prior side-light type backlight module. The backlight module 90 comprises a back plate 91 having a side wall 911 and supporting a light guide plate 92. Optical films (group) 93 are placed on the light guide plate 92. And a plastic frame 94 covers an outer peripheral edge of the back plate 91 and secures the optical films 93 and the light guide plate 92 thereby forming the side-light type backlight module 90.

The main difference between the structures of the direct-light type backlight module and the side-light type backlight module is that: there is no the light guide plate 92 disposed on the back plate 91. The direct-light type backlight module and the side-light type backlight module are similar in the fixing mechanism of the optical films 93. Whether in the direct-light type backlight module or in the side-light type backlight module, the optical films 93 are provided for enhancing the brightness on the central portion of the backlight module 90 and the whole backlight uniformity. However, the base materials of the optical films 93 are mostly polyethylene terephthalate (PET), so the friction coefficient therebetween is small. If the optical films 93 don't be well fixed, they easily jump out. At present, the common way is to employ the plastic frame 94 shown in FIG. 1 to press the optical films 93. But the clearance is often created due to the hot-expansion and cold-shrinkage factor of the plastic material and the PET material, resulting in the optical films 93 not be well fixed.

Moreover, because of according with the narrow frame design of the LCD, the area of the optical films 93 pressed by the plastic frame 94 also must be reduced. Accordingly, the fixing effect by the plastic frame 94 fixing the optical films 93 becomes worse. Furthermore, the optical films 93 in the backlight module also can be fixed by adhering an adhesive tape. Namely, the optical films 93 adhere to the light guide plate 92 or the side wall 911 of the back plate 91. But because most of the adhesive tapes easily lose effectiveness when tested under high-temperature and high-humidity environments, the precision of this mode is bad and the labor cost is also higher.

Hence, it is needed to provide a fixing mechanism for a backlight module and a backlight module to solve the problem existed in the prior art.

BRIEF SUMMARY OF THE INVENTION

The present invention provides a fixing mechanism for a backlight module and a backlight module, thereby solving the problem of an optical assembly not being well fixed.

A primary object of the present invention is to provide a fixing mechanism for a backlight module and a backlight module, being capable of steadily fixing an optical assembly.

To achieve the aforementioned object of the present invention, the present invention provides a fixing mechanism for a backlight module. The backlight module comprises a back plate and an optical assembly. The fixing mechanism comprises a plurality of retaining posts and a plurality of retaining sheets. The retaining sheets are made of elastic materials, and each of the retaining sheets has a retaining hole. The optical assembly disposes a plurality of through holes, and the through holes are corresponding to the retaining posts. And the retaining posts are disposed on the back plate and pass through the through holes of the optical assembly. The retaining hole of the retaining sheet is engaged with the retaining post, and the retaining sheets are pressed upon the optical assembly.

In one embodiment of the present invention, the retaining post disposes a first holding portion on an upper end thereof, the retaining sheet correspondingly disposes a second holding portion in the retaining hole, and the second holding portion is engaged with the first holding portion.

In one embodiment of the present invention, the first holding portion of the retaining post is a groove, and the second holding portion of the retaining hole of the retaining sheet is a flange; or the first holding portion of the retaining post is a flange, and the second holding portion of the retaining hole of the retaining sheet is a groove.

In one embodiment of the present invention, the optical assembly is a combination of a light guide plate and an optical film, the optical film is disposed above the light guide plate, the retaining posts are disposed on the outside of the light guide plate, the through holes are disposed on the optical film, and the retaining sheets are pressed upon the optical film.

In one embodiment of the present invention, the optical assembly is a light guide plate, the through holes are disposed on the light guide plate, and the retaining sheets are pressed upon the light guide plate.

In one embodiment of the present invention, the optical assembly is an optical film. The retaining post has a shape, an upper portion of which being thinner than a lower portion thereof, and forms a supporting portion to support the optical film. The through holes are disposed on the optical film and the retaining sheets are pressed upon the optical film.

In one embodiment of the present invention, the retaining post has a shape, an upper portion of which being thinner than a lower portion thereof, and forms a supporting portion to support the optical film. The through holes are disposed on the optical film and the retaining sheets are pressed upon the optical film.

In one embodiment of the present invention, the retaining posts are fixed to the back plate by the manner of rivet joint, weld or block connection.

To achieve the aforementioned object of the present invention, the present invention also provides a fixing mechanism for a backlight module. The backlight module has a back plate and an optical assembly. The fixing mechanism comprises a plurality of retaining posts, on an upper end of which a ring groove is disposed. A portion of the retaining post, which is located above the ring groove, is made of elastic materials. The optical assembly includes an optical film. The optical film has a plurality of holding holes, each of which is formed by a first circular hole and a second circular hole intersecting each other. The diameter of the first circular hole is slightly greater than that of the retaining post, and the diameter of the second circular is slightly greater than that of the ring groove of the retaining post. The retaining posts are disposed on the back plate. And the second circular hole of the holding hole of the optical film is engaged with the ring groove of the retaining post.

In one embodiment of the present invention, the retaining posts are fixed to the back plate by the manner of rivet joint, weld or block connection.

In one embodiment of the present invention, the fixing mechanism further includes a light guide plate, the light guide plate disposes a plurality of through holes, the through holes are corresponding to the retaining posts, the retaining posts pass through the through holes of the light guide plate, and a surface of the optical film is in contact with a surface of the light guide plate.

To achieve the aforementioned object of the present invention, the present invention also provides a backlight module. The backlight module includes a back plate, an optical assembly and a plurality of fixing mechanisms. The fixing mechanism includes a plurality of retaining posts. The retaining posts are fixed to the back plate. The optical assembly has a plurality of through holes. The retaining posts pass through the through holes, and the fixing mechanisms are pressed upon the optical assembly.

In one embodiment of the present invention, the fixing mechanism further includes a plurality of retaining sheets being made of elastic materials, each of the retaining sheets has a retaining hole, the through holes are disposed on the optical assembly and corresponding to the retaining posts, the retaining posts are disposed on the back plate and pass through the through holes of the optical assembly, the retaining hole of the retaining sheet is engaged with the retaining post, and the retaining sheets are pressed upon the optical assembly.

In one embodiment of the present invention, the retaining post disposes a first holding portion on an upper end thereof, the retaining sheet correspondingly disposes a second holding portion in the retaining hole, and the second holding portion is engaged with the first holding portion.

In one embodiment of the present invention, the first holding portion of the retaining post is a groove, and the second holding portion of the retaining hole of the retaining sheet is a flange.

In one embodiment of the present invention, the first holding portion of the retaining post is a flange, and the second holding portion of the retaining hole of the retaining sheet is a groove.

In one embodiment of the present invention, the retaining post has a shape, an upper portion of which being thinner than a lower portion thereof, and forms a supporting portion to support an optical film; the through holes are disposed on the optical film; and a retaining sheet are pressed upon the optical film.

In one embodiment of the present invention, the retaining posts are fixed to the back plate by the manner of rivet joint, weld or block connection.

In one embodiment of the present invention, the retaining post disposes a ring groove on an upper end thereof. A portion of the retaining post, which is located above the ring groove, is made of elastic materials. The optical assembly includes an optical film. The optical film has a plurality of holding holes, each of which is formed by a first circular hole and a second circular hole intersecting each other. The diameter of the first circular hole is slightly greater than that of the retaining post. The diameter of the second circular is slightly greater than that of the ring groove of the retaining post. The retaining posts are disposed on the back plate. And the second circular hole of the holding hole of the optical film is engaged with the ring groove of the retaining post.

In one embodiment of the present invention, the optical assembly further includes a light guide plate, the light guide plate disposes a plurality of through holes, the through holes are corresponding to the retaining posts; the retaining posts pass through the through holes of the light guide plate, and a surface of the optical film is in contact with a surface of the light guide plate.

A fixing mechanism for a backlight module and a backlight module of the present invention, the optical assembly employs the retaining post to pass through the through hole of the optical assembly for fixing the optical assembly. The part of the fixing structure is made of elastic materials. Therefore, the fixing mechanism not only can steadily fix the optical film and make no clearance to be created, but also can prevent the optical film from escaping from orientation under the effect of hot-expansion and cold-shrinkage. And the fixing mechanism makes the optical film be easily mounted and saves materials.

DETAILED DESCRIPTION OF THE PREFERRED EMBODIMENTS

For more clearly and easily understanding the object, the feature and the advantage of the present invention, the following text will take preferred embodiments of the present invention with reference to the accompanying drawings for detail description as follows.

Figure 1:
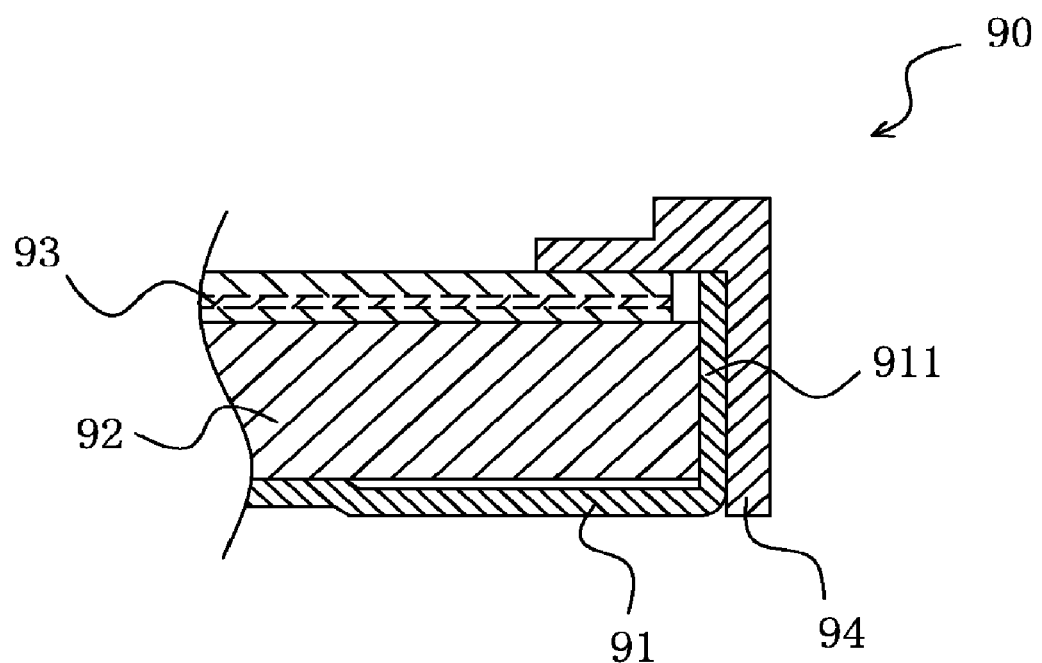
FIG. 1 is a partial sectional view of a prior side-light type backlight module.
Figure 2:
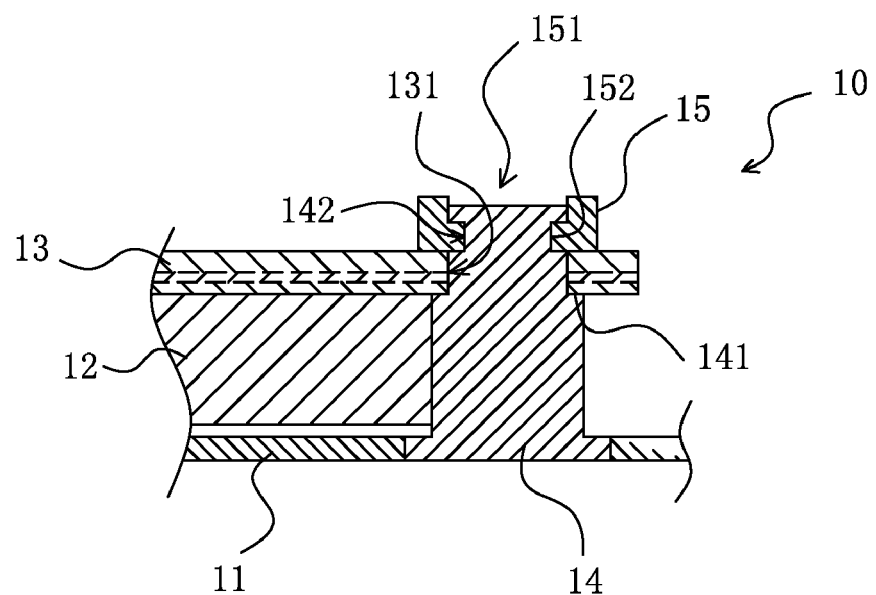
FIG. 2 is a partial sectional view of a first embodiment of a backlight module of the present invention.

Please refer to FIG. 2, which is a partial sectional view of a first embodiment of a backlight module of the present invention. The backlight module 10 includes a back plate 11, an optical assembly and a fixing mechanism for the optical assembly. In each embodiment of the present invention, the optical assembly is a light guide plate or a combination of the light guide plate and an optical film. And in this embodiment, the optical assembly includes a light guide plate 12 and an optical film 13. The light guide plate 12 is placed on the back plate 11, and the optical film 13 is placed on the light guide plate 12. The optical film 13 may be one layer, one group or multilayer structure, which are called the optical film 13 in the present invention. The fixing mechanism of the optical assembly includes a plurality of retaining posts 14 and a plurality of retaining sheets 15.

Figure 3:
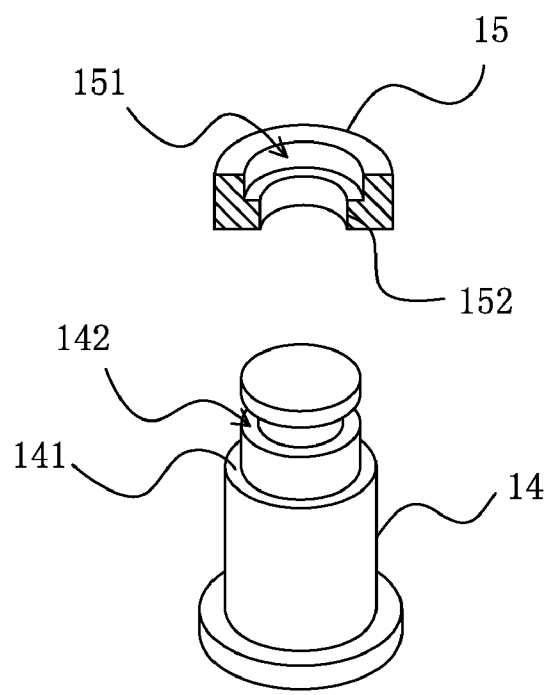
FIG. 3 is an exploded view of a retaining post and a retaining sheet of the first embodiment of the backlight module of the present invention.

Please simultaneously refer to FIG. 2 and FIG. 3, FIG. 3 is an exploded view of the retaining post 14 and the retaining sheet 15 of FIG. 2, wherein the retaining sheet 15 is shown by a sectional view. The optical film 13 disposes a plurality of through holes 131. Each of the through holes 131 is corresponding to one retaining post 14. The retaining post 14 passes through the through hole 131 of the optical film 12 to fix the optical film 13. The retaining sheet 15 has a retaining hole 151. The retaining hole 151 of the retaining sheet 15 holds an upper end of the retaining post 14 for fixing the retaining sheet 15, and a bottom surface of the retaining sheet 15 is in close contact with a top surface of the optical film 13 for fixing the optical film 13.

The optical film 13 is placed on the light guide plate 12. Preferably, the retaining post 14 has a shape, an upper portion of which is thinner than a lower portion thereof, and forms a supporting portion 141 to support the optical film 13. The height of the lower portion of the retaining post 14 is generally equal to that of the light guide plate 12. Moreover, the retaining post 14 disposes a first holding portion 142 on the upper end thereof, and the retaining sheet 15 disposes a second holding portion 152 corresponding to the first holding portion 142 in the retaining hole 151. The second holding portion 152 is held in the first holding portion 142. Preferably, the first holding portion 142 of the retaining post 14 is a groove, and the second holding portion 152 of the retaining sheet 15 is a flange. The retaining sheet 15 is preferably made of elastic materials, such as silicone and rubber. Therefore, the second holding portion 152 of the retaining sheet 15 can be held in the first holding portion 142 of the retaining post 14 by the aid of the elastic of material.

The light guide plate 12 is placed on the back plate 11, and the retaining posts 14 are positioned on the outside of the light guide plate 12. The retaining posts 14 pass through the through holes 131 of the optical film 13 to fix the optical film 13. The second holding portion 152 of the retaining sheet 15 is engaged with the first holding portion 142 of the retaining post 14, and the bottom surface of the retaining sheet 15 is in contact with the top surface of the optical film 13 for fixing the optical film 13 and the light guide plate 12. Because the retaining sheet 15 is preferably made of elastic materials, the retaining sheet 15 can steadily fix the optical film 13 and make no clearance to be created along an upright direction, and the optical film 13 cannot escape from orientation even if suffering from the effect of hot-expansion and cold-shrinkage. And being compared with the prior fixing mode of employing the plastic frame to fix the optical film, the present invention employs the retaining post 14 and the retaining sheet 15 to fix the optical film 13, so that this fixing mode is easily mounted and saves materials.

Furthermore, the retaining post 14 in the first embodiment of the present invention is preferably a metal post, which is fixed to the back plate 11 by the mode of rivet joint, but the present invention cannot be limited to this. The retaining post 14 also may select to be made of other materials, such engineering plastic. The retaining post 14 also may select other fixing modes to be fixed on the back plate 11, such as weld or block connection.

Moreover, in the first embodiment of the present invention, the through hole 131 of the optical film 13 is a circular hole, but the present invention cannot be limited to this. The through hole 131 may be provided with other shapes or an opening shape determined by the application demand.

Although the first embodiment of the present invention is described with a side-light type backlight module, the present invention also can be applied to a direct-light type backlight module. The main difference of the direct-light type backlight module and the side-light type backlight module is that: the back plate 11 does not dispose the light guide plate 12 thereon, but disposes a direct type backlight source. Besides, the structure of fixing the optical film 13 may be same. Therefore, the fixing mechanism of the present invention may be applied to the direct-light type backlight module and the side-light type backlight module. But when being applied to the direct-light type backlight module, the retaining post 14 supports the optical film 13 by the supporting portion 141 because there is no the light guide plate 12 to support the optical film 13.

Figure 4:
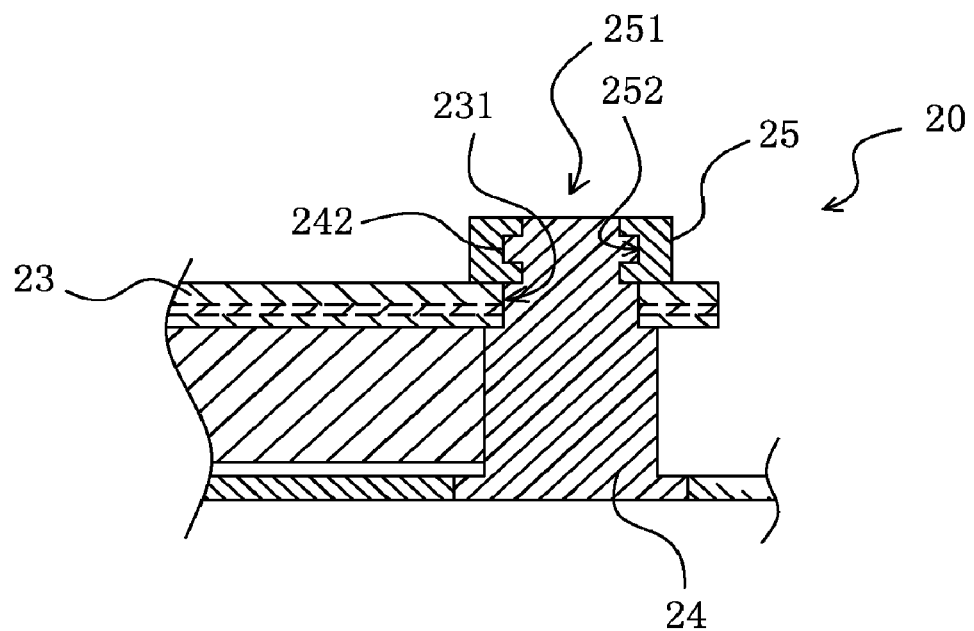
FIG. 4 is a partial sectional view of a second embodiment of the backlight module of the present invention.
Figure 5:
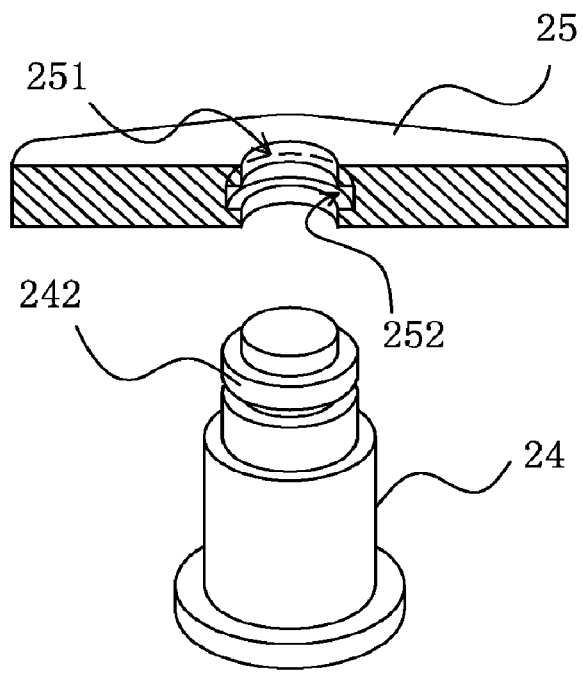
FIG. 5 is an exploded view of a retaining post and a retaining sheet of the second embodiment of the backlight module of the present invention.

Please refer to FIG. 4 and FIG. 5, FIG. 4 is a partial sectional view of a second embodiment of the backlight module of the present invention, and FIG. 5 is an exploded view of a retaining post and a retaining sheet of FIG. 4, wherein the retaining sheet 25 is shown by a sectional view. The backlight module 20 of the second embodiment of the present invention is generally same as the backlight module 10 of the first embodiment of the present invention, the difference therebetween is that: in this embodiment, a first holding portion 242 of the retaining post 24 of the backlight module 20 is a flange, and a second holding portion 252 of a retaining hole 251 of the retaining sheet 25 is a groove. The retaining post 24 passes through a through hole 231 of an optical film 23 for retaining the optical film 23. The second holding portion 252 of the retaining sheet 25 is engaged with the first holding portion 242 of the retaining post 24, and a bottom surface of the retaining sheet 25 is in contact with a top surface of the optical film 23 for fixing the optical film 23.

Furthermore, the retaining sheet 25 of this embodiment may be designed as irregular or symmetrical other non-circular shapes, such as rectangle or long oval, according to the application demand. Accordingly, after the retaining sheet 25 is engaged with the retaining post 24, the contact area of the optical film 23 pressed by the retaining sheet 25 is increased thereby enhancing the effect of fixing the optical film 23.

Figure 6:
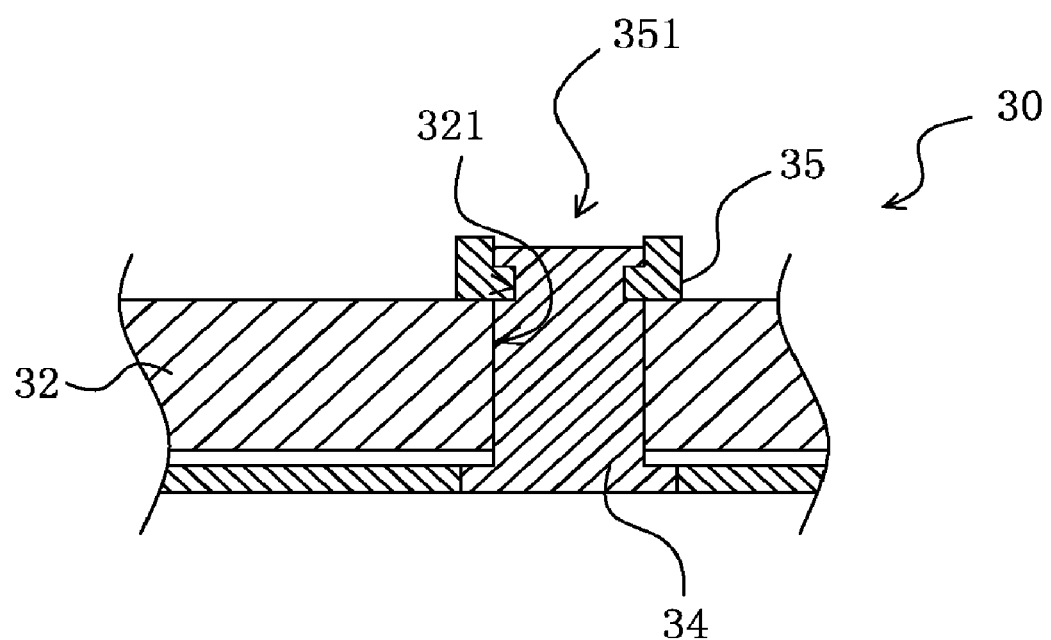
FIG. 6 is a partial sectional view of a third embodiment of the backlight module of the present invention.

Please refer to FIG. 6, which is a partial sectional view of a backlight module of a third embodiment of the present invention. The backlight module 30 of the third embodiment of the present invention is generally same as the backlight module 10 of the first embodiment of the present invention, the difference therebetween is that: in this embodiment, the optical assembly is a light guide plate 32, and the light guide plate 32 disposes a plurality of through holes 321, which are corresponding to the retaining posts 34. The light guide plate 32 is orientated by the retaining posts 34 passing through the through holes 321. A retaining sheet 35 can fix the light guide plate 32 by a retaining hole 351 being engaged with upper ends of the retaining posts 34 and the retaining sheet 35 being pressed upon a top surface of the light guide plate 32.

Figure 7:
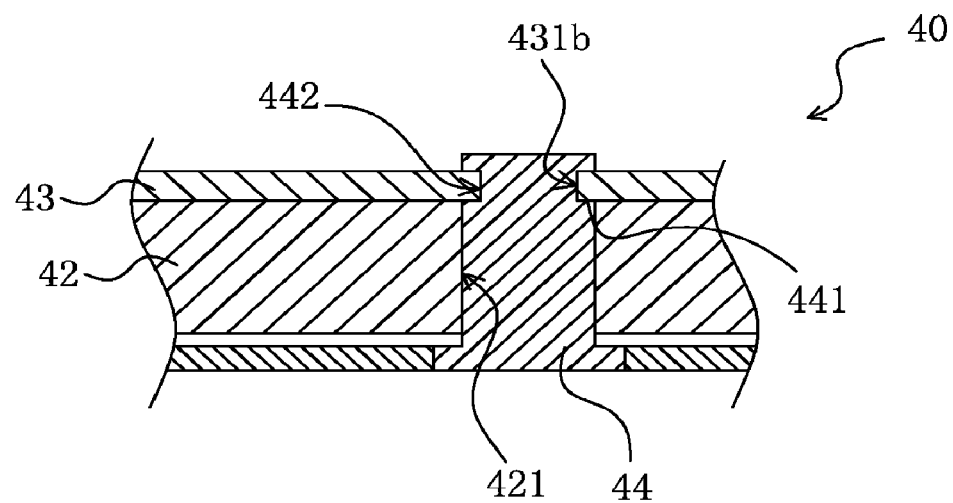
FIG. 7 is a partial sectional view of a fourth embodiment of the backlight module of the present invention.
Figure 8:
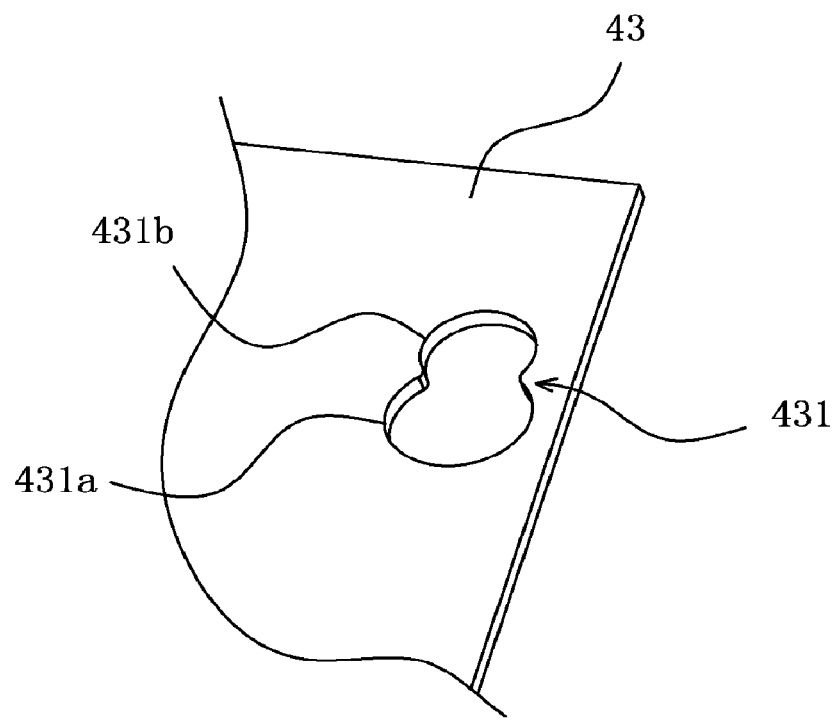
FIG. 8 is a partial perspective view of an optical film of the fourth embodiment of the backlight module of the present invention.

Please again refer to FIG. 7 and FIG. 8, FIG. 7 is a partial sectional view of a backlight module of a fourth embodiment of the present invention, and FIG. 8 is a partial perspective view of an optical film of the fourth embodiment of the present invention. The backlight module 40 of the fourth embodiment of the present invention is generally same as the backlight module 30 of the third embodiment of the present invention, the difference therebetween is that: in this embodiment, the optical assembly includes a light guide plate 42 and an optical film 43. The fixing mechanism includes a plurality of retaining posts 44. The retaining post 44 disposes a ring groove 442 on an upper end thereof. A portion of the retaining post 44, which is located above the ring groove 442, is made of elastic materials. And the optical film 43 has a plurality of holding holes 431, each of which is formed by a first circular hole 431a and a second circular hole 431b intersecting each other. The diameter of the first circular hole 431a is slightly greater than that of the retaining post 44. The diameter of the second circular hole 431b is slightly greater than or equal to that of the ring groove 442 of the retaining post 44. The light guide plate 42 disposes a plurality of through holes 421. The through holes 421 are corresponding to the retaining posts 44. The retaining post 44 passes through the through hole 441 of the light guide plate 42. The retaining post 44 gets into the first circular hole 431a of the holding hole 431 to pass through the optical film 43, and then the optical film 43 is moved to the location of the ring groove 442 of the retaining post 44, and the optical film 43 is pressed upon the light guide plate 42. Then, the optical film 43 is moved to make the second circular hole 431b thereof be engaged with the ring groove 442 of the retaining post 44, thereby fixing the optical film 43 and the light guide plate 42. However, the present invention cannot be limited to this. When applied to the direct-light type backlight module, the fixing mechanism is used to just fix the optical film 43 to the retaining post 44 because of no light guide plate 42.

In conclusion, comparing with the prior art, the present fixing mechanism for the backlight module mainly includes a plurality of retaining posts and a plurality of retaining sheets, and the retaining posts are disposed on the back plate. The retaining sheets are engaged with the upper ends of the retaining posts and the retaining sheet are pressed upon the optical assembly, so that fixing the optical assembly. Because the elastic material is applied in the fixing mechanism, the fixing mechanism not only can steadily fix the optical assembly and make no clearance to be created, but also can prevent the optical assembly from escaping from orientation under the effect of hot-expansion and cold-shrinkage. And the fixing mechanism is easily mounted and saves materials.

The present invention has been illustrated by the above embodiments, but the above embodiments only are used as examples for implementing the present invention. It must need to be pointed out that the exposed embodiments cannot limit the scope of the present invention. Oppositely, the modification and equivalent structures included within the spirit and scope of the appended claims are also included within the scope of the present invention.

What is claimed is:

1. A fixing mechanism for a backlight module, the backlight module comprising a back plate and an optical assembly, characterized in that: the fixing mechanism comprising a plurality of retaining posts and a plurality of retaining sheets, the retaining sheets being made of elastic materials, each of the retaining sheets having a retaining hole;

the optical assembly disposing a plurality of through holes, the through holes corresponding to the retaining posts; and the retaining posts being disposed on the back plate and passing through the through holes of the optical assembly, the retaining hole of the retaining sheet engaged with the retaining post, and the retaining sheets being pressed upon the optical assembly;

the retaining post disposing a first holding portion on an upper end thereof, the retaining sheet correspondingly disposing a second holding portion in the retaining hole, and the second holding portion being engaged with the first holding portion;

the first holding portion of the retaining post being a groove, and the second holding portion of the retaining hole of the retaining sheet being a flange; or the first holding portion of the retaining post being a flange, and the second holding portion of the retaining hole of the retaining sheet being a groove.

2. The fixing mechanism as claimed in claim 1, characterized in that: the optical assembly is a combination of a light guide plate and an optical film, the optical film is disposed above the light guide plate, the retaining posts are disposed on the outside of the light guide plate, the through holes are disposed on the optical film, and the retaining sheets are pressed upon the optical film.

3. The fixing mechanism as claimed in claim 1, characterized in that: the optical assembly is a light guide plate, the through holes are disposed on the light guide plate, and the retaining sheets are pressed upon the light guide plate.

4. The fixing mechanism as claimed in claim 1, characterized in that: the retaining post has a shape, an upper portion of which being thinner than a lower portion thereof, and forms a supporting portion to support an optical film; the through holes are disposed on the optical film; and the retaining sheets are pressed upon the optical film.

5. The fixing mechanism as claimed in claim 1, characterized in that: the retaining posts are fixed to the back plate by the manner of rivet joint, weld or block connection.

6. A fixing mechanism for a backlight module, the backlight module comprising a back plate and an optical assembly, characterized in that: the fixing mechanism comprising a plurality of retaining posts, on an upper end of which a ring groove is disposed; a portion of the retaining post, which is located above the ring groove, being made of elastic materials; the optical assembly including an optical film; the optical film having a plurality of holding holes, each of which is formed by a first circular hole and a second circular hole intersecting each other; the diameter of the first circular hole being slightly greater than that of the retaining post;

the diameter of the second circular being slightly greater than that of the ring groove of the retaining post; the retaining posts being disposed on the back plate; and the second circular hole of the holding hole of the optical film being engaged with the ring groove of the retaining post.

7. The fixing mechanism as claimed in claim 6, characterized in that: the retaining posts are fixed to the back plate by the manner of rivet joint, weld or block connection.

8. The fixing mechanism as claimed in claim 6, characterized in that: the optical assembly further comprises a light guide plate, the light guide plate disposes a plurality of through holes, the through holes are corresponding to the retaining posts, the retaining posts pass through the through holes of the light guide plate, and a surface of the optical film is in contact with a surface of the light guide plate.

9. A backlight module, characterized in that: the backlight module comprising a back plate, an optical assembly and multiple fixing mechanisms, the fixing mechanism comprising a plurality of retaining posts, the retaining posts being fixed to the back plate, the optical assembly having a plurality of through holes, the retaining posts passing through the through holes, and the fixing mechanisms being pressed upon the optical assembly;

the optical assembly including an optical film, the through holes being disposed on the optical film; the retaining post having a shape, an upper portion of which being thinner than a lower portion thereof, and the retaining post forming a supporting portion to support the optical film; and the fixing mechanism further including a plurality of retaining sheets being made of elastic materials, each of the retaining sheets having a retaining hole, the retaining hole of the retaining sheet being engaged with the retaining post, and the retaining sheets being pressed upon the optical film.

10. The backlight module as claimed in claim 9, characterized in that: the retaining post disposes a first holding portion on an upper end thereof, the retaining sheet correspondingly disposes a second holding portion in the retaining hole, and the second holding portion is engaged with the first holding portion.

11. The backlight module as claimed in claim 10, characterized in that: the first holding portion of the retaining post is a groove, and the second holding portion of the retaining hole of the retaining sheet is a flange.

12. The backlight module as claimed in claim 10, characterized in that: the first holding portion of the retaining post is a flange, and the second holding portion of the retaining hole of the retaining sheet is a groove.

13. The backlight module as claimed in claim 9, characterized in that: the retaining posts are fixed to the back plate by the manner of rivet joint, weld or block connection.

* * * * *